Patented Feb. 24, 1948

2,436,428

UNITED STATES PATENT OFFICE 2,436,428

QUATERNARY AMMONIUM SALTS OF DIBENZTHIAZYL AZO BENZENES

Norman Hulton Haddock and Clifford Wood, Blackley, Manchester, England, assignors to Imperial Chemical Industries Limited, a corporation of Great Britain No Drawing. Application April 13, 1945, Serial No. 588,239. In Great Britain May 8, 1944

6 Claims. (Cl. 260—158)

The present invention relates to the manufacture of new yellow azo dyestuffs and in particular to such dyestuffs which are quaternary ammonium salts derived from 4:4'-dibenzthiazyl-(2)-azobenzene and are suitable for dyeing cellulosic material.

We have found that if 4:4'-di(6-methylbenzthiazyl-2)-azobenzene carrying at least one chloromethyl group as substituent is allowed to react with pyridine, a quaternary ammonium salt is formed. This salt dissolves readily in water to form a yellow solution which dyes cotton yellow. In carrying out such a dyeing, it is advantageous that there be present in the dyebath a mild alkali, for instance, sodium carbonate. In this way bright yellow shades are obtained which possess excellent fastness to washing. In place of pyridine other tertiary bases may be employed as indicated below.

Accordingly, the present invention relates to a process for the manufacture of new yellow azo dyestuffs which comprises heating a 4:4'-dibenzthiazyl-(2)-azobenzene which has directly substituted in it at least one chloromethyl group, and may optionally carry one or more halogen alkyl (1-4C) or alkoxy (1-4C) substituents, with a tertiary base.

Examples of starting materials for use in this invention include di(chloromethyl)-4:4'-di(6-methylbenzthiazyl-2)-azobenzene (made by treating 4:4'-di(6-methylbenzthiazyl-2)-azobenzene with sym. dichlorodimethyl ether), di(chloromethyl)-4:4'-di(benzthiazyl-2)-azobenzene, di(chloromethyl)-4:4'-di(6-ethoxybenzthiazyl-2)-azobenzene and di(chloromethyl)-4:4'-di(6-methylbenzthiazyl-2)-azobenzene.

The tertiary bases to be used in accordance with the present invention include, for instance: pyridine, hexahydrodimethyl-aniline, triethylamine, triethanolamine, tetra methylthiourea, diethylaminoethyl alcohol.

The present dyestuffs appear to be, as already indicated above, quaternary ammonium salts. They dye cotton in bright yellow shades, advantageously from a dyebath containing a mild alkali, such as sodium carbonate or sodium bicarbonate. The use of the present new dyestuffs in such a dyebath, namely one containing a mild alkali, constitutes a further feature of the present invention.

The yellow shades obtained upon cotton by means of the present dyestuffs possess very good fastness to washing, open soda boiling and soda ash treatment, equalling in these respects dyeings of Caledon Yellow G (Colour Index No. 1241). Their fastness to light is also very good.

The following examples in which the parts are by weight, illustrate but do not limit the invention.

Example 1

12 parts of chloromethylated 4:4'-di(6-methylbenzthiazyl-2)-azobenzene (made as described below) are mixed with 150 parts of pyridine. The resulting suspension is boiled for 10 minutes. It turns bright yellow as the quaternary ammonium salt is produced. After dilution with twice its volume of acetone, the suspension is filtered. The filter cake is washed with acetone to remove pyridine, and dried in air. The new quaternary ammonium salt is thus obtained as a bright yellow powder.

The chloromethylated 4:4'-di(6-methylbenzthiazyl-2)-azobenzene employed above is made as follows: 10 parts of 4:4'-di(6-methylbenzthiazyl-2) azobenzene are dissolved in 150 parts of 100% sulphuric acid below 30° C. and 50 parts of symmetrical dichlorodimethyl ether are added. The mixture is quickly heated to 60° C. and maintained at this temperature for 20 minutes. The red solution obtained is poured on to 100 parts of a mixture of ice and water, filtered and the filter cake washed with water till free of acid. The product is dried in the air. 12 parts of a pale yellow powder are obtained.

A dyebath is made by dissolving 1 part of this dyestuff in 1500 parts of water. 50 parts of bleached cotton yarn are put into the dyebath. The temperature is raised to 60° C. and maintained thereat. Thrice, at 10-minute intervals, after the temperature of 60° C. has been attained, 1 part of soda ash is added to the dyebath, the cotton yarn being occasionally turned. The dyebath is kept at 60° C. for a further 15 minutes. The cotton is then removed, washed with water and dried. It is bright yellow in shade. The dyeing possesses good fastness to washing and open soda boiling, being similar in these respects to dyeings of Caledon Yellow G (Colour Index No. 1241).

Example 2

5 parts of di(chloromethyl)-4:4'-di(6-methylbenzthiazyl-2)-azobenzene are added to 25 parts of tetramethyl thiourea with stirring at 80–90° C. The mixture is stirred during a further 90 minutes at this temperature. The yellow solution so obtained is poured into 200 parts of acetone. The suspension is filtered and the filtercake washed with acetone. The product is dried in the air. The dyestuff is obtained as a bright yellow powder. It dyes cotton a bright yellow shade from a dyebath containing mild alkali as described in Example 1. Similar dyestuffs are obtained by using di(chloromethyl)-4:4'-di(benzthiazyl-2)-azobenzene and di(chloromethyl)-4:4'-di(6-ethoxybenzthiazyl-2)-azobenzene instead of di(chloromethyl)-4:4'-di(6-methylbenzthiazyl-2)-azobenzene.

*Example 3*

5 parts of di(chloromethyl)-4:4'-di(6-methylbenzthiazyl-2)-azobenzene are added to 30 parts of benzyl alcohol and 1.75 parts of triethylamine. The mixture is heated at 95° C. for four hours, then cooled and poured into 200 parts of acetone. The solution is poured slowly into a large volume of ether. The precipitated solid is filtered off, washed with ether and dried in the air. A yellow powder is obtained. It may be used to dye cotton as described in Example 1.

*Example 4*

5 parts of di(chloromethyl)-4:4'-di(6-methylbenzthiazyl-2)-azobenzene are added to 37 parts of β-ethoxyethanol and 2.3 parts of dimethylcyclohexylamine. The mixture is heated at 120° C. for two hours. The product is cooled and poured into 200 parts of acetone. The solution is then poured into 200 parts of benzene. The precipitated solid is filtered off, washed with benzene and dried in the air. The dyestuff is obtained as a yellow powder. It dyes cotton a bright yellow shade using a dyebath containing a mild alkali, as described in Example 1.

We claim:

1. A quaternary compound represented by the formula

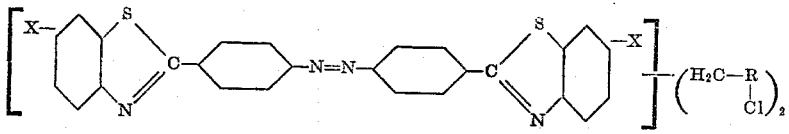

wherein R is one of the group consisting of pyridine, tetramethylthiourea, triethylamine and dimethylcyclohexylamine; each X is one of the group consisting of hydrogen, methyl and ethoxy; and wherein the $CH_2$ group and chlorine are joined to a nitrogen of R.

2. A compound in accordance with claim 1 in which X is methyl.

3. The compound in accordance with claim 1 in which X is methyl and R is the radical of pyridine.

4. The compound in accordance with claim 1 in which X is methyl and R is the radical of tetramethyl-thiourea.

5. The compound in accordance with claim 1 in which X is methyl and R is the radical of dimethylcyclohexylamine.

6. The process of manufacturing an azo dyestuff which dyes cotton in shades of yellow which comprises making a mixture comprising a tertiary base of the group consisting of pyridine, tetramethylthiourea, triethylamine and dimethylcyclohexylamine and di(chloromethyl)-4,4'-di(6-substituted-benzthiazyl-2)-azobenzene in which the 6-substituted group is one of the group consisting of hydrogen, methyl and ethoxy; and heating the mixture to reaction temperature until a quaternary compound is formed.

NORMAN HULTON HADDOCK.
CLIFFORD WOOD.

REFERENCES CITED

The following references are of record in the file of this patent:

UNITED STATES PATENTS

| Number | Name | Date |
| --- | --- | --- |
| 2,368,657 | Haddock | Feb. 6, 1945 |
| 2,368,658 | Haddock | Feb. 6, 1945 |
| 2,384,283 | Conrad | Sept. 4, 1945 |